United States Patent [19]

Suzuki et al.

[11] Patent Number: 4,658,584
[45] Date of Patent: Apr. 21, 1987

[54] POWER STEERING SYSTEM FOR VEHICLES

[75] Inventors: Masahiko Suzuki, Hoi; Kazuma Matsui, Toyohashi; Koichi Moriguchi, Nagoya; Masatoshi Kuroyanagi, Kariya, all of Japan

[73] Assignee: Nippondenso Co., Ltd., Kariya, Japan

[21] Appl. No.: 708,884

[22] Filed: Mar. 6, 1985

[30] Foreign Application Priority Data

| Mar. 7, 1984 [JP] | Japan | 59-44768 |
| Mar. 24, 1984 [JP] | Japan | 59-56888 |
| Apr. 4, 1984 [JP] | Japan | 59-68274 |

[51] Int. Cl.$^4$ .............................. F15B 7/08
[52] U.S. Cl. .................. 60/450; 60/443; 60/452
[58] Field of Search ............ 60/385, 443, 444, 452, 60/450

[56] References Cited

U.S. PATENT DOCUMENTS

| 3,429,123 | 2/1969 | Burroughs | 60/450 |
| 3,931,711 | 1/1976 | Rau et al. | |
| 3,996,742 | 12/1976 | Goff | |
| 4,094,144 | 6/1978 | Staly et al. | 60/452 X |
| 4,452,041 | 6/1984 | Rau | 60/452 X |
| 4,452,274 | 6/1984 | Haga et al. | 91/375 A |
| 4,454,716 | 6/1984 | Rau | 60/452 X |
| 4,507,920 | 4/1985 | Rau | 60/450 X |
| 4,535,798 | 8/1985 | Sano | 137/625.21 |
| 4,577,660 | 3/1986 | Haga et al. | 137/625.32 X |

FOREIGN PATENT DOCUMENTS 2232018 1/1974 Fed. Rep. of Germany ........ 60/450

Primary Examiner—A. Michael Chambers
Assistant Examiner—John C. Fox
Attorney, Agent, or Firm—Cushman, Darby & Cushman

[57] ABSTRACT

An improved power steering system for vehicles is utilized in association with a variable discharge pump for supplying pressure fluid to one of both cylinder chambers divided by a piston of a power cylinder, selectively. The power steering system includes a variable throttle provided in a fluid supplying passage between the pump and the cylinder chamber. Upon rotation of a steering shaft, an adjusting member adjusts a cross sectional area of the variable throttle in accordance with the variable steering torque. The power steering system also includes a discharge quantity controller for controlling a discharge quantity of the pressure fluid of the pump so that a pressure differential between up and downstreams of the variable throttle is constant. The discharge quantity of the pressure fluid of the pump is changed to be suitable to the any variable steering torque.

12 Claims, 14 Drawing Figures

POWER STEERING SYSTEM FOR VEHICLES

BACKGROUND OF THE INVENTION

The present invention relates to a power steering system for vehicles, and more particularly to a power steering system for vehicles provided with a variable discharge type fluid pump.

The system of this kind generally includes a steering mechanism for transmitting rotation of a steering shaft of a vehicle to a piston shaft of a power cylinder to operate wheels and a variable discharge type pump driven by a prime mover to generate pressure fluids, whereby the pressure fluid from the pump is selectively supplied to one of both cylinder chambers of said power cylinder to aid rotation of said steering mechanism.

U.S. Pat. Nos. 3,931,711 and 3,996,742 disclose a mechanism in which a discharge amount of pressure fluid generated per unit operating stroke by a pump is controlled in response to the steering torque or steering speed. This mechanism is in response to fluid pressure on the upstream side of a throttle which varies in opening area in response the steering torque or steering speed generated in the steering mechanism.

SUMMARY OF THE INVENTION

An object of the present invention is to provide a power steering system for vehicles which is small and can be assembled in compact fashion and in which the discharge amount of pressure fluids generated by a variable discharge pump accurately- corresponds to steering torque or steering speed.

The basic characteristic of the power steering system for vehicles in accordance with the present invention comprises variable throttle means provided on a flowpassage for supplying pressure fluid from a variable discharge type pump to cylinder chambers of a power cylinder to vary a cross sectional area of said flowpassage, flowpassage switching means for connecting, in selectively response to the rotating direction of the steering shaft, selected one of the cylinder chambers to a downstream side of the variable throttle means in fluid manner whereas the other cylinder chamber being connected to a fluid reservoir of the pump in fluid manner, adjusting means in response to the steering torque to adjust an orifice sectional area of the variable throttle means to be larger in accordance with an increase in steering torque, and discharge amount control means for controlling a discharge amount of pressure fluid of the pump so that a pressure difference in fluid between up and down-streams of the variable throttle means is constant.

DESCRIPTION OF THE PREFERRED EMBODIMENTS

Figure 1:
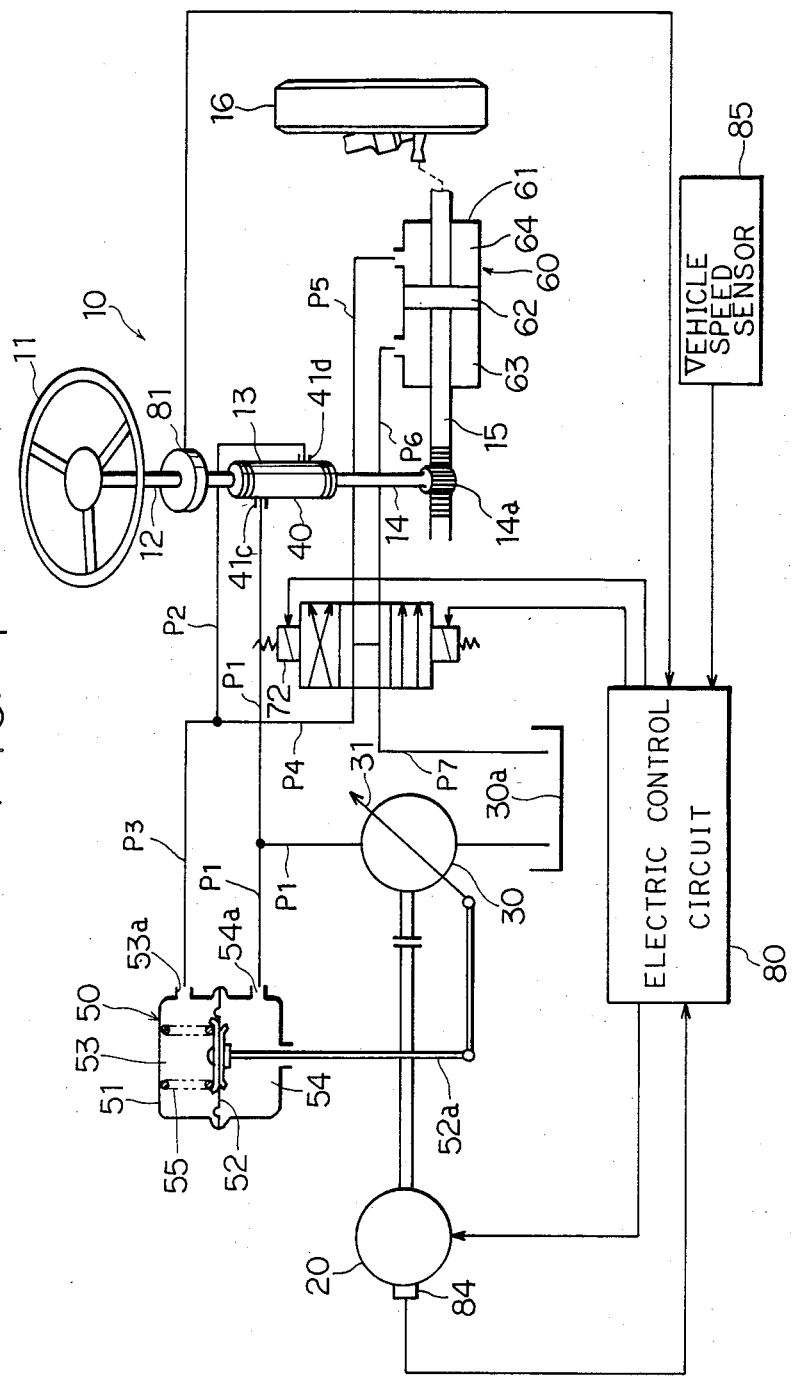
FIG. 1 is an overall view of a first embodiment of the present invention.

In the following, a first embodiment of the present invention will be described. FIG. 1 shows a power steering system for vehicles in accordance with the present invention. This power steering system comprises a steering mechanism 10, which transmits rotation in a left (or right) direction of a steering shaft 12 resulting from rotational operation in a left (or right) direction of a steering wheel 11 to an output shaft 14 through a torsion bar 13 (see FIGS. 1 and 2) to change it into an axial movement in a left (or right) direction of a rack bar 15 by rotation in a left (or right) direction of a pinion 14a at the end of the output shaft 14 whereby a vehicle wheel 16 may be directed in a left (or right) direction through a tie rod (not shown).

The power steering system further comprises a dc motor 20, a variable discharge type oil pump 30 connected to the dc motor 20, a variable throttle valve 40 coaxially mounted on the torsion bar 13, a constant differential actuator 50 connected to the oil pump 30, a power cylinder 60 mounted on the rack bar 15, and an electromagnetic switching valve 70 connected between the power cylinder 60 and the variable throttle valve 40, the oil pump 30 being driven by the dc motor 20 to pump working oil from a reservoir 30a in response to an eccentric amount e of an eccentric cam 31 to discharge the oil as pressure oil into an oil passage P.

Figure 2:
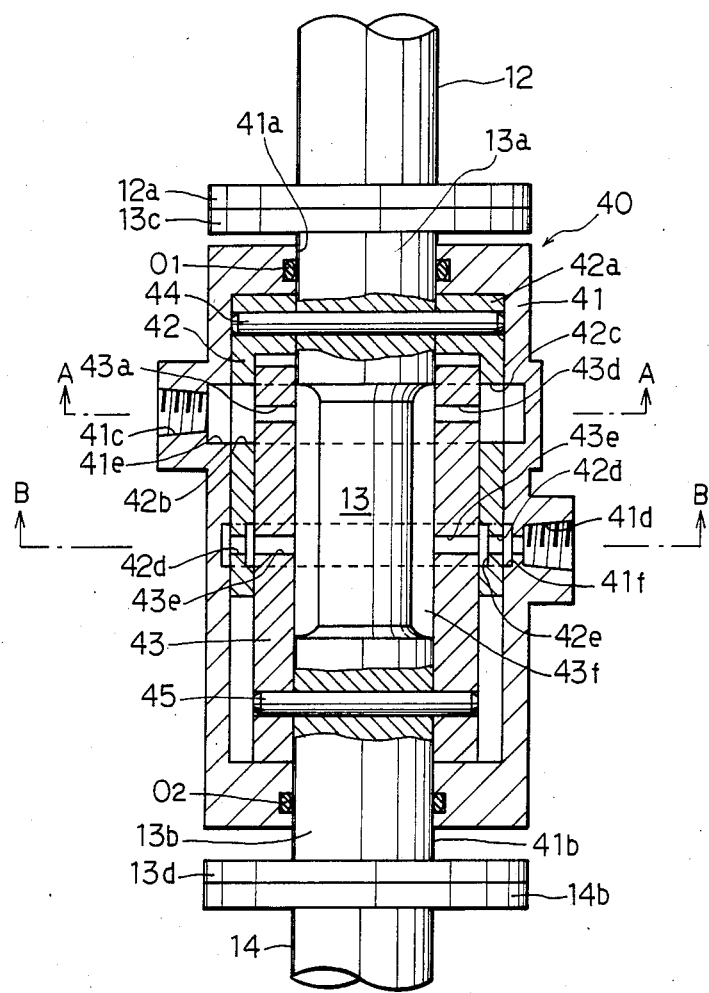
FIG. 2 is a longitudinal sectional view of a variable throttle valve shown in FIG. 1.

The variable throttle valve 40 has a housing 41, as shown in FIG. 2, which in turn has insert holes 41a, 41b bored in both upper and lower walls thereof which are coaxially and rotatably fitted in an upper end 13a and a lower end 13b of the torsion bar 13 through oil seals 01, 02, respectively. The housing 41 further has an inlet port 41c and an outlet port 41d provided in oil passages P1, P2 (see FIG. 1), respectively, said housing having two annular grooves 41e, 41f formed along the circumferential direction of the inner circumferential surface thereof, said annular groove 41e being communicated with the inlet port 41c at the bottom whereas said annular groove 41f communicated with the outlet port 41d at the bottom (see FIGS. 2, 3 and 5).

The variable throttle valve 40 comprises a pair of cylindrical valve members 42, 43 coaxially mounted on the torsion bar 13 within the housing 41, the valve member 42 being fitted and fixed at pin 44 on an upper end 13a of the torsion bar 13 at the upper wall 42a with the outer circumferential surface liquid-tightly fitted in the inner circumferential surface of the housing 41. In the upper portion of the circumferential wall of the valve member 42 are bored a pair of strip-like notches 42b, 42c symmetrically with respect to the axis of the torsion bar 13 in communication with the annular groove 41e of the housing 41 as shown in FIGS. 2 and 3, a lateral width along the circumferential direction of the valve member 42 of the notches 42b, 42c being a fixed width 11 (shown only for the notch 42b in FIG. 4), and a longitudinal width along the axial direction of the valve member 42 of the notches 42b, 42c being in coincidence with a width of an opening of the annular groove 41e.

Figure 5:
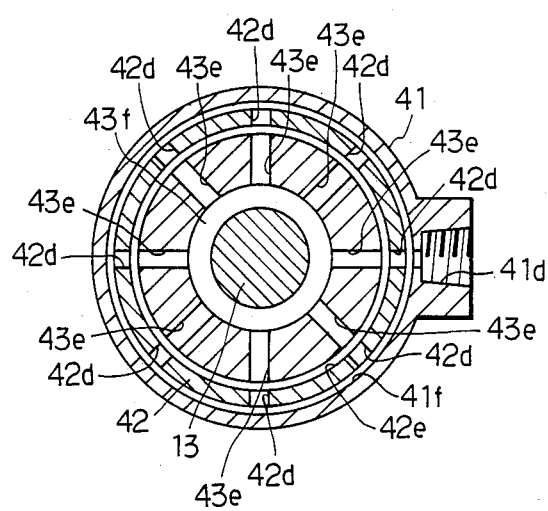
FIG. 5 is a cross sectional view taken on line B—B of FIG. 2.

In the lower portion of the circumferential wall of the valve member 42 are bored eight communicating holes 42d radially as shown in FIGS. 2 and 5 in communication with the annular groove 41f of the housing 41, and in the lower inner circumferential surface of the circumferential wall of the valve member 42 is formed an annular groove 42e along the circumferential direction thereof in communication with the holes 42d at the bottom. The valve member 43 is fitted and fixed by a pin 45 to the lower end 13b of the torsion bar 13 at the lower end thereof with the valve member 43 being fitted into the valve member 42, the outer circumferential surface of the circumferential wall of the valve member 43 being liquid-tightly slidable in a circumferential direction with respect to the inner circumferential surface of the valve member 42, the upper end of the inner circumferential surface of the valve member 43 being slidable in the circumferential direction with respect to the lower end of the outer circumferential surface of the upper end 13a of the torsion bar 13.

Figure 3:
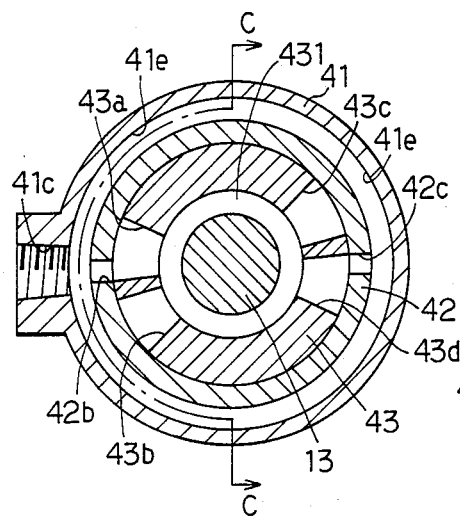
FIG. 3 is a cross sectional view taken on line A—A of FIG. 2.
Figure 4:
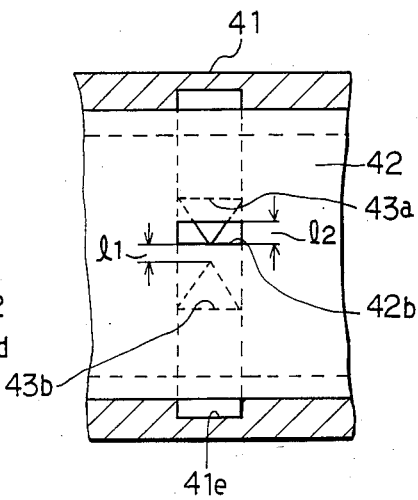
FIG. 4 is a fragmentary longitudinal sectional view taken on line C—C of FIG. 3.

In one side of the upper end of the circumferential wall of the valve member 43 are bored a pair of of triangular notches 43a, 43b along the circumferential direction thereof so that they are divergent in opposite direction each other with their vertical angles opposed as shown in FIGS. 2 to 4, a spacing 12 (see FIG. 4) between the vertical angles of the notches 43a and 43b being slightly greater than a lateral width 11 of the notch 42d. When the torsional angle $\theta$ of the torsion bar 13 is zero, both the notches 43a and 43b are overlapped with and communicated with the notch 42b in a direction of lateral width from opposite sides each other in one and the same predetermined area including the vertical angle. When the torsion bar 13 has the torsional angle $\theta$ ($<0$) in a left direction (corresponding to rotation in a left direction of the steering handle 11), the area of overlapping communication between the notch 43a and the notch 42b under the communication and cut-off between the notches 42b and 43b increases, and on the other hand, when the torsion bar 13 has the torsional angle $\theta(>0)$ in a right direction, the area of overlapping communication between the notch 43a and the notch 42b under the communication and cut-off between both the notches 42b and 43b increases.

Also, on the other side of the upper end of the circumferential wall of the valve member 43 are bored a pair of triangular notches 43c, 43d along the circumferential direction so that they are in symmetrical with a pair of notches 43a, 43b with respect to the axis of the torsion bar 13 as shown in FIGS. 2 and 3, said spacing 12 being provided also between the vertical angles of the notches 43c and 43d. When the torsional angle $\theta$ of the torsion bar 13 is zero, both the notches 43c and 43d are overlapped with and communicated with the notch 42c in a direction of lateral width from opposite sides each other in one and the same predetermined area including the vertical angle. When the torsion bar 13 has the torsional angle $\theta$ ($<0$) in a left direction, the area of overlapping and communication between the notch 43d and the notch 42c under the communication and and cut-off between both the notches 42c and 43c increases, and on the other hand, when the torsion bar 13 has the torsional angle $\theta$ ($>0$) in a right direction, the area of overlapping communication between the notch 43c and the notch 42c under the communication and cut-off between both the notches 42c and 43d increases.

In the central portion of the circumferential wall of the valve member 43 are bored eight communication holes 43e along the circumferential direction thereof so that they are on the same radius as that of each communication hole 42d of the valve member 42, said communication hole 43e being in communication with the annular groove 42e at one end and in communication with the notches 43a to 43d through an annular hollow portion 43f formed between the torsion bar 13 and the valve member 43 at the other end. The torsion bar 13 is coaxially connected to a flange portion 12a of the steering shaft 12 and a flange portion 14b of the output shaft 14 at the upper and lower flange portions 13c and 13d, respectively.

In the variable throttle valve 40 constructed as described above, when the torsion bar 13 is free from the torsional angle $\theta$, pressure oil within the oil passage P1 flows into the oil passage P2 via the inlet port 41c, annular groove 41e, overlapping and communication area (i.e., said predetermined area) between the notch 42b and both notches 43a and 43b and overlapping and communication area (i.e., said predetermined area) between the notch 42c and both the notches 43c, 43d, annular hollow portion 43f, communication holes 43e, annular groove 42a, communication holes 42d, annular groove 41f and outlet port 41d. In such cases, a variable throttle area S of the variable throttle valve 40 is in coincidence with an area S min (see FIG. 6) corresponding to the sum of said overlapping and communication areas, said area S min preventing occurrence of generation of bubbles within the variable throttle valve 40 and controlling an amount of pressure oil as small possible as required in consideration of setting a neutral state of the variable throttle valve 40.

Figure 6:
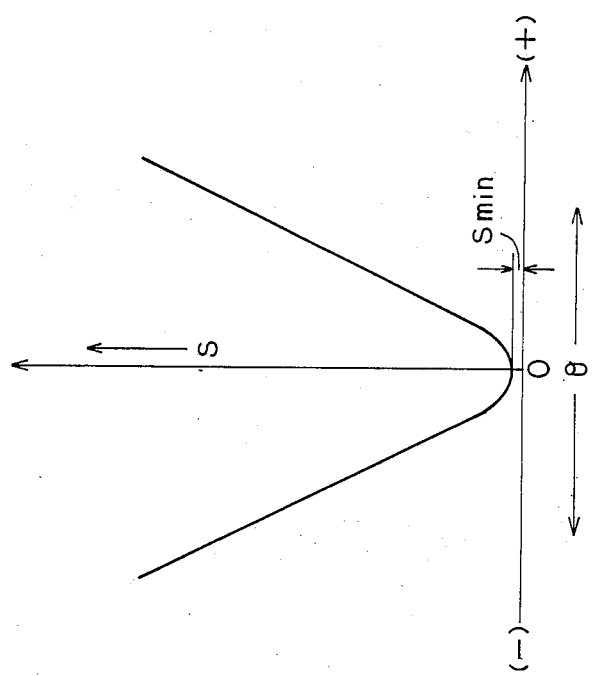
FIG. 6 is a characteristic view showing the relationship between a throttle area of the variable throttle valve and a torsional angle of a torsion bar.

When the torsional angle $\theta$ ($<0$) in a left direction relative to the torsion bar 13 occurs, an area corresponding to the overlapping and communication area between both notches 42b and 43a and overlapping and communication area between both notches 42c and 43d is set as shown in FIG. 6 in response to an increase in absolute value of the torsional angle $\theta$ ($>0$) as the variable throttle area S of the variable throttle valve 40. On the other hand, when the torsional angle $\theta$ in a right direction relative to the torsion bar 13, an area corresponding to the overlapping and communication area between both notches 42b and 43b and overlapping and communiction area between both notches 42c and 43c is set as shown in FIG. 6 in response to an increase in torsional angle $\theta$ as the variable throttle area of the variable throttle valve 40. Let $\Delta P$ be the differential pressure between the inlet port 41c and outlet port 41d of the variable throttle valve 40, and let Q be the quantity of pressure oil flowing into the oil passage P2 from the outlet port 41d, then Q is proportional to $\Delta P$.

The constant differential actuator 50 has a casing 51, within which a diaphragm 52 is mounted to form a low pressure chamber 53 and a high pressure chamber 54. The low pressure chamber 53 has a port 53a, which is connected the outlet port 41d of the variable throttle valve 40 through oil passages P3 and P2. On the other hand, the high pressure chamber 54 has a port 54a, which is connected to a discharge opening of the oil pump 30 through the oil passage P1. The diaphgram 52 is provided with an L-shape rod 52a which passes through the high pressure chamber 54 and extends downwardly in FIG. 1, and the outer end of the rod 52a is in communication with the eccentric cam 31 of the oil pump 30.

Figure 7:
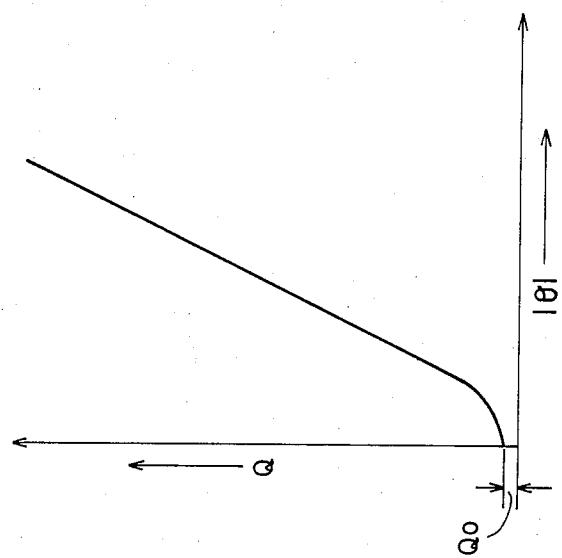
FIG. 7 is a characteristic view showing the relationship between an amount of outflow pressure oil from the variable throttle valve and the torsional angle of the torsion bar.

The constant differential actuator 50 moves the diaphragm 52, that is, the rod 52a upward (or downward) to reduce (or increase) the eccentric amount e of the eccentric cam 31 so that the differential pressure between the high and low pressure chambers 54 and 53, that is, the differential pressure ΔP of the variable throttle valve 40 is constant. This means that the quantity of discharge of pressure oil from the oil pump 30 in response to the control with respect to the quantity of eccentric e of the eccentric cam 31 under the constant of the differential pressure ΔP of the variable throttle valve 40 of the constant differential actuator 50 is controlled. In such case, the displacement of the diaphragm 52 varies with the difference between oil pressure within the high pressure chamber 54 and the sum of oil pressure within the low pressure chamber 53 and a spring force of a compressive coil spring 55 mounted within the low pressure chamber 53. Accordingly, the pressure oil quantity Q is proportional to the variable throttle area S under ΔP=constant, and therefore, the proportional relation as in FIG. 7 is established between the pressure oil quantity Q and the absolute value of the torsional angle θ under the proportional relation between S and |θ| in FIG. 6. Reference character Q0 in FIG. 7 designates the pressure oil quantity Q when the variable throttle area S=S min.

An electromagnetic switching valve 70 causes an oil passage P4 connected to both oil passages P2 and P3 and both oil passages P5 and P6 connected to a power cylinder 60 to communicate with a reservoir 30a through an oil passage P7 under deenergization of both solenoids 71, 72. The valve 70 further causes, upon energization of the solenoid 71, oil passage P4 to communicate with oil passage P6 and oil passage P5 to communicate with oil passage P7. Upon energization of the solenoid 72, oil P3 communicates with oil passage P5 and oil passage P6 communicates with oil passage P7. A power cylinder 60 is constructed such that a piston 62 is supported on a rack bar 15 within a cylinder 61 so it is slidably fitted to form left and right chambers 63 and 64, which are respectively connected to the electromagnetic valve 70 by both the oil passages P6 and P5. The power cylinder 60 is constructed such that pressure oil is fed into the left chamber 63 through the oil passages P2, P4, electromagnetic valve 70 and oil passage P6 from the variable throttle valve 40 to move the piston 62 rightward to aid the rotating operation in the right direction of the steering handle 11. Also, the power cylinder 60 is constructed such that pressure oil is fed into the right chamber 64 via the oil passage P4, electromagnetic switching valve 70 and oil passage P5 to move the piston 62 to aid the rotating operation in the left direction of the steering handle 11. Pressure oil within the right chamber 64 (or left chamber 63) is discharged, upon the rightward movement (or leftward movement) of the piston 62, to the reservoir 30a via the electromagnetic switching valve 70 and oil passage P7.

Figure 8:
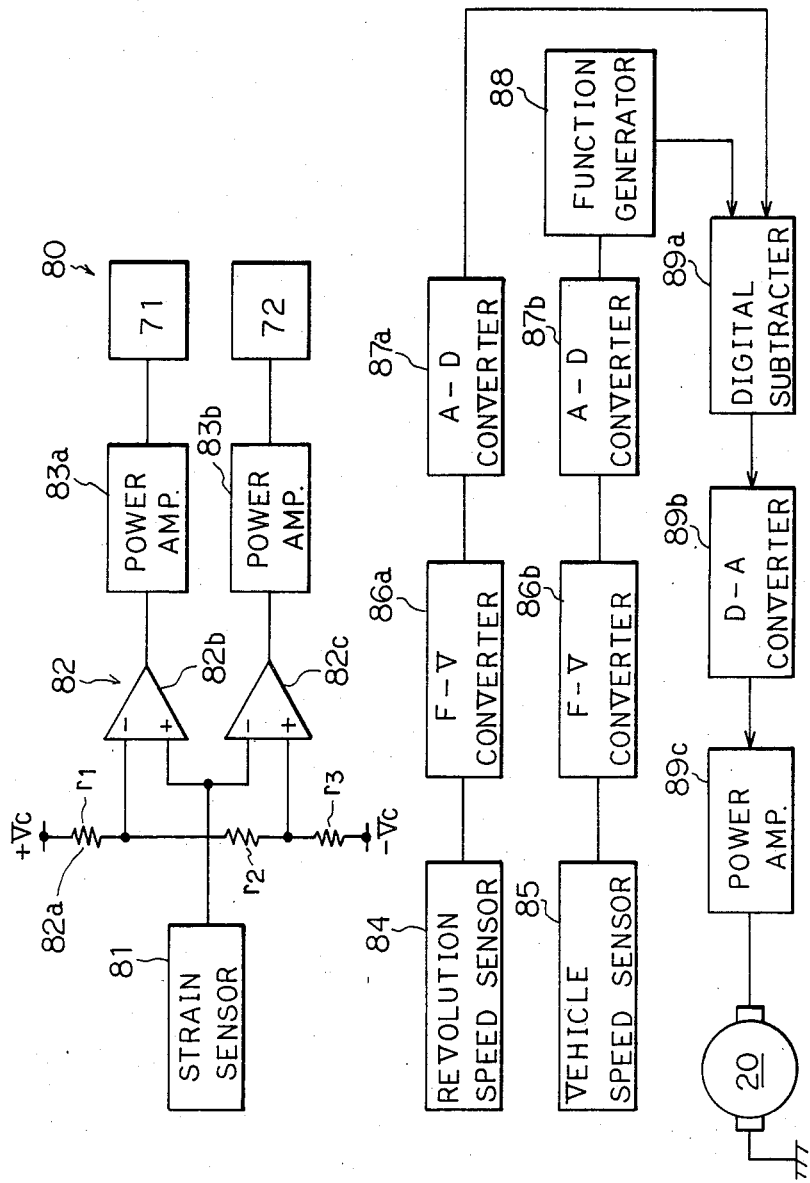
FIG. 8 is a circuitry representation of an electric control circuit in the first embodiment.

A power steering system has an electric control circuit 80, as shown in FIGS. 1 and 8, which comprises a comparator circuit 82 connected to a strain sensor 81, both power amplifiers 83a, 83b connected to the comparator circuit 82, frequency/voltage converters 86a, 86b (hereinafter referred to as F-V converters 86a, 86b) respectively connected to a rotational speed sensor 84 and a vehicle speed sensor 85, A-D converters 87a, 87b respectively connected to the F-V converters 86a, 86b, a function generator 88 connected to the A-D converter 87b, a digital subtracter 89a connected to the A-D converter 87a and function generator 88, a D-A converter 89b connected to the digital subtracter 89a and a power amplifier 89c connected to the D-A converter 89b.

The strain sensor 81 is mounted on the steering shaft 12 to generate a strain signal which provides a negative symbol upon rightward rotation of the steering shaft 12 and provides a positive symbol upon leftward rotation of the steering shaft 12. In such case, when the rotational angle Ψ of the steering shaft 12 is Ψ=0, a level of the strain signal is also 0.

The comparator circuit 82 comprises a voltage divider 82a and a pair of comparators 82b and 82c, the voltage divider 82a dividing applied voltages +Vc to −Vc from a dc power source by series resistors r1, r2 and r3 to generate a first divided voltage from a common terminal of both series resistors r1 and r2, and to generate a second divided voltage from a common terminal of both series resistors r2 and r3. In such case, the first divided voltage corresponds to the sum of a level of the strain signal representative of Ψ=0 and the predetermined voltage ΔV, and the second divided voltage corresponds to a difference between the level of the strain signal representative of Ψ=0 and the predetermined voltage ΔV. However, 2 ΔV corresponds to the range of the play angle of the steering handle 11. The comparator 82b generates a high level signal when the level of the strain signal from the strain sensor 81 is higher than the first divided voltage from the voltage divider 82a, and on the other hand, the comparator 82c generates a high level signal when the level of the strain signal from the strain sensor 81 is lower than the second reference voltage from the voltage divider 82a. When the level of the strain signal is between the first and second divided voltages, the high level signals from both the comparators 82b and 82c l extinguish.

A power amplifier 83a is provided to power-amplify the high level signal from the comparator 82b to fed as an exciting signal necesary for exciting the solenoid 71 of the electro-magnetic switching valve 70 to the solenoid 71. On the other hand, a power amplifier 83b is provided to power-amplify the high level signal from the comparator 82c to feed it as an exciting signal necessary for exciting the solenoid 72 of the electro-magnetic switching valve 70 to the solenoid 72. The rotation speed sensor 84 is provided to detect the rotation speed of the dc motor 20 to generate a pulse signal at the frequency proportional thereto. The vehicle speed sensor 85 is provided to detect vehicle speed of the vehicle to generate a pulse signal at the frequency proportional thereto. The F-V converter 86a is provided to convert the frequency of the pulse signal from the rotation speed sensor 84 into the analog voltage proportional thereto, and on the other hand, the F-V converter 86b is provided to convert the frequency of the pulse signal from the vehicle speed sensor 85 into the analog voltage proportional thereto. The A-D converter 87a is provided to convert the analog voltage from the F-V converter 86a into the digital voltage whereas the A-D converter 87b is provided to convert the analog voltage from the F-V converter 86b into the digital voltage (hereinafter referred to as "vehicle speed digital voltage Vs).

Figure 9:
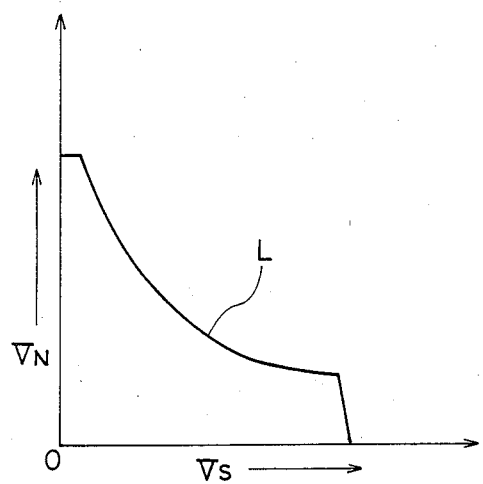
FIG. 9 is a characteristic view showing the relationship between a speed voltage and a vehicle speed digital voltage.

The function generator 88 stores the data L (see FIG. 9) representative of the relation between the speed voltage VN representative of the predetermined optimum rotation speed and the digital voltage Vs, and the speed voltage VN is generated in response to the vehicle digital voltage Vs from the A-D converter 87b on the basis of said data L. In this case, consideration is taken so that the quantity of discharged oil of the oil pump 30 is proportional to the product of the rotation speed of the oil pump 30 (that is, the dc motor 20) and the eccentric amount e of the eccentric cam 31 and if the quantity of discharged oil of the oil pump 30 decreases in response to an increase in vehicle speed as compared with the necessary quantity of pressure oil as the piston 62 in the power cylinder 60 moves, the steering feeling of the steering handle 11 becomes heavy. The maximum value of the eccentric amount e of the eccentric cam 31 corresponds to a predetermined value of the torsional angle $\theta$ (which is smaller than the maximum value of the torsional angle $\theta$) of the torsion bar 13.

The digital subtracter 89a counts a difference between the digital voltage from the A-D converter 87a and the speed digital voltage VN from the function generator 88 to generate it as a subtraction voltage. The D-A converter 89b converts the subtraction voltage from the digital subtractor 89a into the analog voltage. The power amplifier 89c power-amplifies the analog voltage from the D-A converter 89b to feed it as the drive voltage necessary for driving the dc motor 20 at the aforesaid optimum rotation speed to the dc motor 20.

In the present embodiment constructed as described above, if the vehicle is set for the straight-forward travel condition, both the converters 82b and 82c do not generate the high level signal by cooperation with the strain sensor 81, and the electromagnetic switching valve 70 causes the oil passages P4, P5 and P6 to communicate with the oil passage P7 under the deenergization of both the solenoids 71 and 72. The analog voltage generated by cooperation with the rotation speed sensor 84 from the F-V converter 86a is converted into the digital voltage by the A-D converter 87a, and the analog voltage generated by cooperation with the vehicle speed sensor 85 from the F-V converter 86b is converted into the vehicle speed digital voltage Vs by the A-D converter 87b. The speed voltage VN is generated from the function generator 88 in connection with the vehicle speed digital voltage Vs, and a difference between the speed voltage VN and the digital voltage from the A-D converter 87a is generated as a subtraction voltage by the digital subtracter 89a. This subtraction voltage is converted into the analog voltage by the D-A converter 89b and thereafter is generated as the drive voltage by the power amplifier 89c, whereby the dc motor 20 runs at the optimum rotational speed in response to the vehicle speed on the basis of said drive voltage.

Then, the oil pump 30 is driven at the optimum rotational speed by the dc motor 20 to generate pressure oil to feed it to the constant differential actuator 50 and variable throttle valve 40 through the oil passage P1. Then, pressure oil from the oil passage P1 is discharged into the reservoir 30a via the inlet port 41c of the variable throttle valve 40, annular groove 41e, notches 42b, 42c, notches 43a, 43b, 43c and 43d, annular hollow portion 43f, communication hole 43e, annular groove 42e, communication hole 42d, annular groove 41f, outlet port 41d, oil passages P2 and P4, electromagnetic switching valve 70 and oil passage P7. In such case, since the variable throttle area S of the variable throttle valve 40 is the minimum throttle area S min (see FIG. 6) on the basis of the torsional angle $\theta = 0$ of the torsion bar 13, the quantity of pressure oil discharged into the reservoir 30a is controlled to the minimum value Q0 (see FIG. 7) to minimize the power loss of the power steering system of this kind. Since at this time, the aforementioned minimum pressure oil Q0 flows within the variable throttle valve 40, no bubble generates within the variable throttle valve 40. The constant differential actuator 50 is subjected to pressure oil from the variable throttle valve 40 through the oil passages P2 and P3 in the low pressure chamber 53 and subjected to pressure oil from the oil pump 30 through the oil passage P1 in the high pressure chamber 54 to control the eccentric amount e of the eccentric cam 31 of the oil pump 30 so that the differential $\Delta P$ between the inlet port 41c and outlet port 41d of the variable valve 40 is constant.

When under the state as described, the steering handle 11 is rotated leftward, the steering shaft 12 is rotated leftward to twist the torsion bar 13 leftward, the output shaft 14 rotates the pinion 14a leftward, and the rack bar 15 is moved to left to change the direction of the steering wheel 16 to left. Since the level of the strain signal generated from the strain sensor 81 resulting from rotation of the steering shaft 12 in a left direction is higher than the first divided voltage from the voltage divider 82a, the high level signal is generated from the converter 82b to generate an exciting signal from the power amplifier 83a. Thereby, the electromagnetic switching valve 70 causes to communicate the oil passage P4 with the oil passage P5 by excitement of the solenoid 71 in response to the exciting signal from the power amplifier 83a and to communicate the oil passage P6 with the oil passage P7.

The notch 42b of the variable throttle valve 40 is cut off from the notch 43b in response to the torsional angle $\theta$ of the torsion bar 13 to increase the overlapping and communication area with the notch 43a, and the notch 42c is cut off from the notch 43c to increase the overlapping and communication area with the notch 43d. This means that the variable throttle area S of the variable throttle valve increases in response to the torsional angle $\theta$ ($<0$) in a left direction of the torsion bar 13. Then, pressure oil from the oil passage P1 passes through the variable throttle valve 40, passes, as the quantity corresponding to the increased variable throttle area S, through the oil passage P2, P4, electromagnetic switching valve 70 and oil passage P5, and flows into the right chamber 64 of the power cylinder 60. Pressure oil within the left chamber 63 is discharged into the reservoir 30a via the oil passage P6, electromagnetic switching valve 70 and oil passage P7. Thereby, the power cylinder 60 promotes the leftward movement of the piston 62, that is, the rack bar 15 by pressure oil within the right chamber 64 to aid the leftward rotating operation of the steering handle 11.

As described above, when the aiding operation of the power cylinder 60 starts, the torsional angle $\theta$ ($<0$) of the torsion bar 13 comes near to zero by the leftward movement of the rack bar 15 to reduce the variable throttle area S of the variable throttle valve 40. In other words, the quantity of pressure oil fed to the right chamber 64 of the power cylinder 60 reduces as the variable throttle area S reduces to attenuate the above-described aiding operation of the power cylinder 60. As will be understood from the foregoing, pressure oil discharged from the oil pump 30 is always controlled to a satisfactory quantity on the basis of the change of the variable throttle area and the vehicle speed in response to the change of the torsional angle $\theta$ of the torsion bar 13 of the variable throttle valve under the function of the constant differential actuator 50. Further, since all pressure oil from the oil pump 30 is fed into the right chamber 64 of the power cylinder 60 through the variable throttle valve 40 and electromagnetic switching valve 70, the leftward steering feeling with respect to the steering handle 11 may be increased (or decreased) in response to the increase (or decrease) of the vehicle speed while making the power loss of the dc motor 20 and oil pump 30 almost zero.

In the above-described operation, if the vehicle speed is increased and the speed voltage VN generated from the function generator 88 is zero in response to the vehicle speed digital voltage Vs from the A-D converter 87b in connection with data L, the power amplifier 89c generate a drive voltage necessary for making the rotational speed of the dc motor 20 zero by cooperation with the digital subtracter 89a and D-A converter 89b on the basis of the digital voltage from the A-D converter 87a and the speed voltage VN=0 from the function generator 88 to stop the dc motor 20 and pump 30 in response thereto. Thereby, the apparatus of the present invention is operated merely by the rotating force relative to the steering handle, and power will be saved by the stoppage of the dc motor 20 and pump 30.

While in the aforementioned operation, the case where the steering handle is rotated to left has been described, it will be noted that even if the steering handle is rotated to right instead, the operation and effect substantially similar to those as described above may be achieved. In such case, this operation is different from that obtained by the leftward rotation of the steering handle 11 in that the level of the strain signal from the strain sensor 81 resulting from rightward rotation of the steering shaft 12 lowers than the second divided voltage of the voltage divider 82a, the high level signal is generated from the comparator 82c in response thereto and generated as an exciting signal by the power amplifier 83b, the electromagnetic switching valve 70 causes to oil passage P4 with oil passage P6 by excitement of the solenoid 72 in response to the exciting signal and communicate with oil passage P5 with oil passage P7, the variable throttle area S of the variable throttle valve 40 is controlled by the overlapping and communication area of both notches 42b and 43b and the overlapping and communication area of both notches 42c and 43c, an the power cylinder 60 provides the aiding operation with respect to the rightward rotating operation of the steering handle 11 on the basis of the rightward movement of the rack bar 15.

While in the above-described embodiment, pressure oil supply switching control relative to the power cylinder 60 has been made by the electromagnetic switching valve 70, it will be noted that instead, the switching control similar to the electromagnetic switching valve 70 can be carried out by coaxially mounting a direction switching valve having a function substantially similar to the electromagnetic switching valve 70 on the steering shaft 12, and making the direction switching valve response to the change in rotational direction of the steering shaft 12.

Furthermore, while in the above-described embodiment, the oil pump 30 has been driven by the dc motor 20, it will be noted that the oil pump 30 can be driven by the internal combustion engine as a power source of vehicles.

Also, while in the above-described embodiment, the pulse signal from the vehicle speed sensor 85 has been fed to the F-V converter 86b, it will be noted that instead, the detected results from means for detecting the rotational speed of the internal combustion engine can be supplied to the F-V converter 86b.

Figure 10:
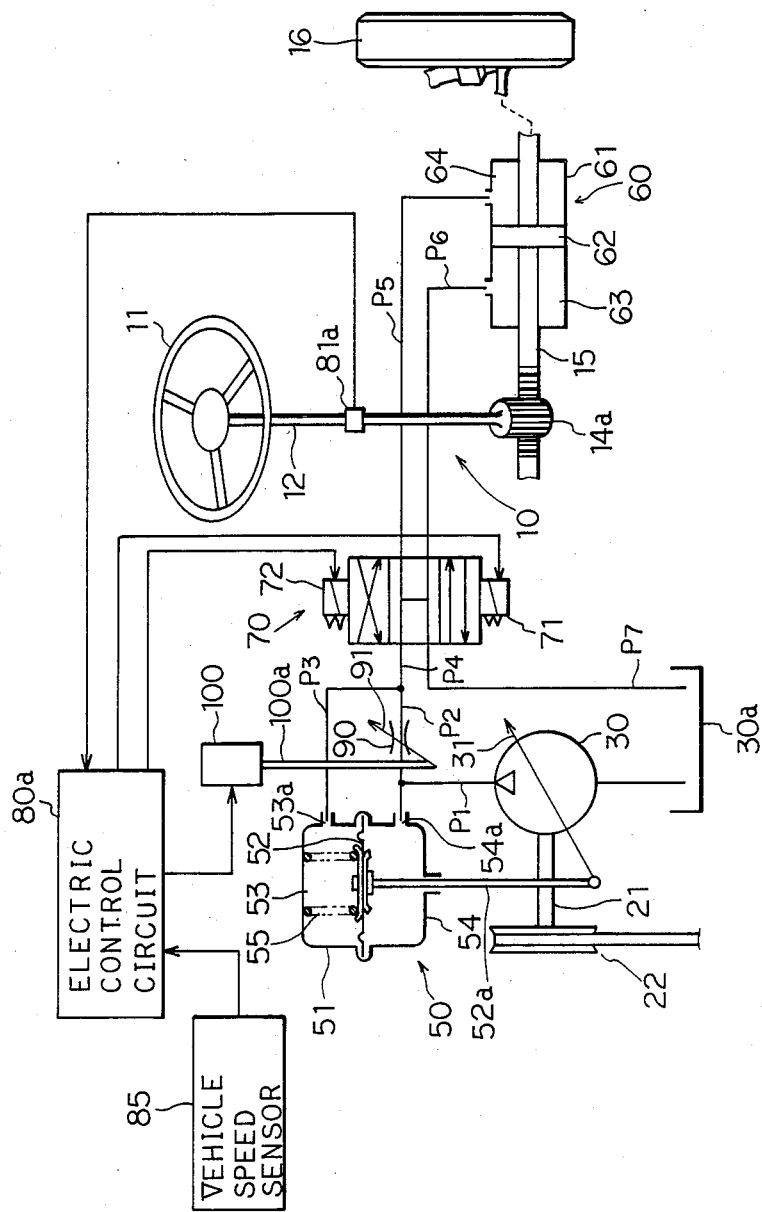
FIG. 10 is an overall view of a second embodiment of the present invention.
Figure 11:
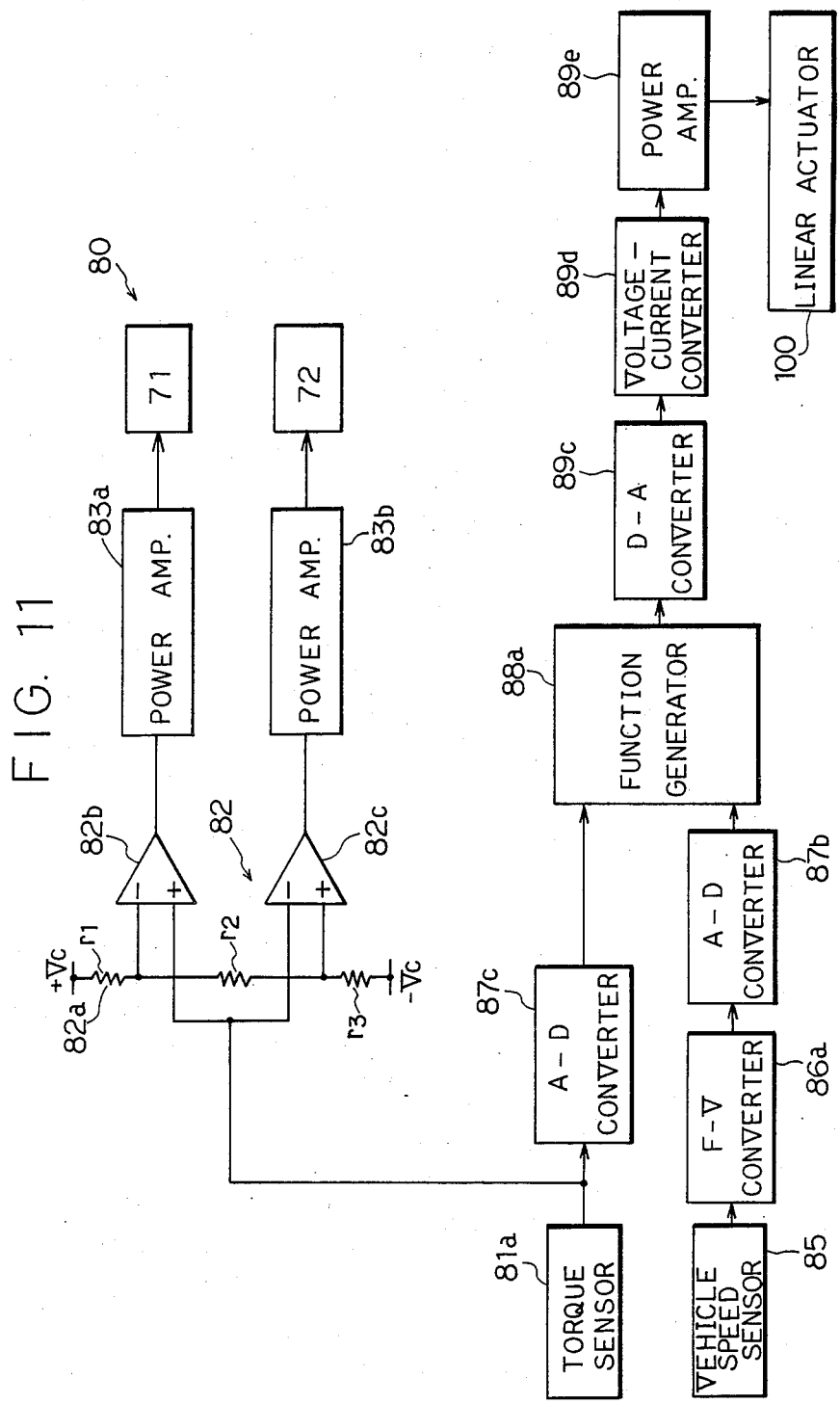
FIG. 11 is a circuitry representation of an electric control circuit in the second embodiment.

A second embodiment of the present invention will now be described in connection with FIGS. 10, 11 and 13.

This power steering system is provided with a steering mechanism 10 similar to that described in the first embodiment.

The power steering system has a variable discharge type oil pump 30, which is connected to the output shaft of the internal combustion engine of the vehicle by a belt mechanism 22 at the rotational shaft 21 thereof. The oil pump 30 is driven by the belt mechanism 22 under the operation of the internal combustion engine, pumps working oil from a reservoir 30a in response to the eccentric amount e of the eccentric cam 31, and discharges it as pressure oil to the oil passage P1. This means that the discharge quantity of pressure oil of the oil pump 30 is controlled by the rotational speed of the oil pump 30 and the eccentric quantity e of the eccentric cam 31.

The oil passage P1 has a variable throttle valve 90 interposed therein, which recieves pressure oil discharged from the oil pump 30 into the upstream portion of the oil passage 1 in response to a variable throttle area S corresponding to a displacement position of a movable element 91 and permits pressure oil flow into the oil passage P2. This means that the quantity of pressure oil flowing into the oil passage P2 (hereinafter referred to as the quantity of downstream pressure oil) is controlled by the variable throttle area S of the variable throttle valve 90.

Further, the steering system comprises a constant differential actuator 50, a power cylinder 60 and an electromagnetic switching valve 70 similar to those as described in the first embodiment.

An electric control circuit 80a comprises a torque sensor 81a, a vehicle speed sensor 85, and a linear actuator 100. The torque sensor 81a is provided to detect a torsional amount of the steering shaft 12 as a steering torque to generate it as a torque voltage. This torque voltage provides a negative symbol by rightward rotation of the steering shaft 12 and a positive symbol by leftward rotation thereof. When rotational angle $\Phi$ is equal to 0, the torque voltage is also 0.

The electric control circuit 80 comprises a comparator circuit 82, and power amplifiers 83a, 83b, and these elements are cooperated with the torque sensor 81a to selectively provide exciting signals necessary for solenoids 71, 72 of the electromagnetic switching valve 70 in connection with the steering direction of the steering shaft 12.

The electric control circuit 80 comprises an F-V converter 86a connected to a vehicle speed sensor 85, A-D converters 87c, 87b, connected to torque sensor 81a and F-V converter 86a, respectively, a function generator 88a connected to these A-D converters 87c, 87b, a D-A converter 89c connected to the function generator 88a, a voltage-current converter 89d connected to the D-A converter 89c, and a power amplifier 89e connected to the voltage-current converter 89d.

Figure 12:
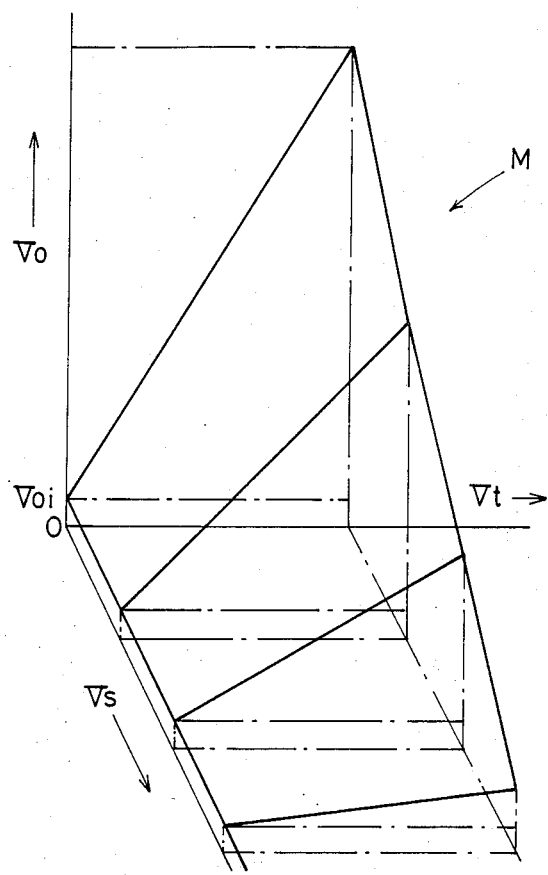
FIG. 12 is a three dimensional map stored to a function generator in FIG. 11.

The function generator 88a pre-stores a three-dimensional map M (shown at the solid line in FIG. 12) representative of the relationship between a digital voltage Vo representative of an optimum area So of the variable throttle valve 90, a torque digital voltage Vt and a vehicle speed digital voltage Vs. The throttle digital voltage Vo is obtained and generated in accordance with the torque digital voltage Vt from the A-D converter 87c and the vehicle speed digital voltage Vs from the A-D converter 84h on the basis of the three-dimensional map M. In such case, in the three-dimensional map M, Vo=-Voi (hereinafter referred to as the initial throttle digital voltage Voi) corresponds to an initial throttle area Soi of the variable throttle valve 90 when Vt is equal to 0 (that is, the torsional quantity of the steering shaft 12=0), the initial throttle area Soi controlling the minimum quantity of pressure oil to be introduced to prevent occurrence of bubbles within the variable throttle valve 90 and other hydraulic circuits.

The D-A converter 89c is provided to analog-convert the throttle digital voltage Vo from the function generator 88a into the throttle voltage. The voltage-current converter 89d is provided to convert the throttle voltage from the D-A converter 89c into a current proportional thereto to generate it as a throttle current signal. The power amplifier 89e is provided to power-amplify a throttle current signal from the voltage-current converter 89d to generate it as a drive signal.

A linear actuator 100 is connected to the movable element 91 of the variable throttle valve 90 at a rod 100a thereof, wherein the rod 100a is displaced in response to the value of the drive signal from the power amplifier 89e to displace the movable element 91 of the variable throttle valve 90 to thereby coincide the variable throttle area S of the variable throttle valve 90 with the optimum throttle area So.

In the present embodiment constructed as described above, if the vehicle is set for its straight-forward travel, the function generator 88a supplies to the D-A converter 89c the initial throttle digital voltage Vo=Voi in response to the torque digital voltage Vt=0 from the A-D converter 87c and the vehicle speed digital voltage Vs from the A-D converter 87b on the basis of the three-dimensional map M.

Then, the linear actuator 100 displaces the rod 100a in response to the drive signal from the power amplifier 89e to coincide the variable throttle area S of the variable throttle valve 90 with the initial throttle area Soi and control the eccentric amount of the eccentric cam 31 of the oil pump 30 so that the constant differential actuator 50 is cooperated with the variable throttle valve 90 to make constant the differential between the up and downstreams of the variable throttle valve 90 under the initial throttle area Soi. Accordingly, in such conditions, pressure oil discharged from the oil pump 30 to the oil passage P1 passes through the variable throttle valve 90 and is discharged as the minimum amount into the reservoir 30a from the electromagnetic switching valve 70 and oil passage P7. In other words, in the straight-forward condition of the vehicle, the amount of discharged oil from the oil pump 30 is restrained to the minimum amount, and therefore, power loss of the power steering system of this kind may be reduced as smallest as possible. In such case, since pressure oil in the minimum amount flows into the variable throttle valve 90 and other hydraulic circuits, no bubbles occur in the variable throttle valve 90 and other hydraulic circuits.

Under these circumstances, when the steering handle 11 is rotated rightward, the steering shaft 12 is rotated leftward to rotate the pinion 14a leftward and the rack bar 15 is moved leftward to operate the steering wheel 16 leftwrd. As the torque voltage generated from the torque sensor 81a resulting from leftward rotation of the steering shaft 12 assumes a high level of positive symbol, the electromagnetic switching valve 70 causes to communicate oil passage P1 with oil passage P5 and oil passage P6 with oil passage P7 by excitement of the solenoid 71 in response to the exciting signal from the power amplifier 89e.

Upon the leftward rotation of the steering shaft 12, the function generator 88a obtains the digital voltage Vo (>Voi) showing the optimum variable throttle area So according to the torque digital voltage Vt (>0) from the A-D converter 87c and the vehicle digital voltage Vs from the A-D converter 87b on the basis of the three-dimentional map M and imparts it to the D-A converter 89c.

The linear actuator 100 displaces the rod 100a in response to the drive signal from the power amplifier 89c to increase the variable throttle area S of the variable throttle valve 90 to the optimum throttle area So, and the constant differential actuator 50 controls the eccentric amount e of the eccentric cam 31 of the oil pump 30 so as to make constant the differential between up and downstreams of the variable throttle valve 90 under the optimum throttle area So by cooperation with the variable throttle valve 90. Accordingly, pressure oil discharged from the oil pump 30 into the oil passage P1 passes through the variable throttle valve 90, increases to the quantity corresponding to the optimum throttle area So, passes through the electromagnetic switching valve 70 and oil passage P5 and flows into the right chamber 64 of the power cylinder 60. Pressure oil within the left chamber 63 passs through the oil passage P6, electromagnetic switching valve 70 and oil passage P7 and is discharged into the reservoir 30a.

Thereby, the power cylinder 60 promotes the leftward movement of the piston 62, that is, the rack bar 15 due to pressure oil within the right chamber 64 to begin aiding the leftward rotating operation of the steering handle 11. In such case, as will be understood from FIG. 12, as the vehicle speed, that is, the vehicle speed digital voltage Vs increases, the throttle digital voltage Vo from the function generator 88a, that is, the optimum throttle area So of the variable throttle valve 90 decreases, and therefore, the quantity of pressure oil fed into the right chamber 64 of the power cylinder 60 from the variable throttle valve 90 through the electromagnetic switching valve 70 decreases as the vehicle speed is higher, to reduce the aiding force by the power cylinder 60 to increase the weight of the steering feeling.

As described above, when the aiding operation of the power cylinder 60 starts, the torsional amount of the steering shaft 12, that is, the torque digital voltage Vt generated from the A-D converter 87a by cooperation with the torque sensor 81a is reduced by leftward movement of the rack bar 15 to reduce the optimum throttle area So of the variable throttle valve 90 in connection with the throttle digital voltage Vo from the function generator 88a. In other words, the quantity of pressure oil fed to the right chamber 64 of the power cylinder 60 reduces as the variable throttle area S of the variable throttle valve 90 reduces to attenuate the above-described aiding action of the power cylinder 60. As will be understood from the foregoing, pressure oil discharged from the oil pump 30 is always restrained to the sufficient amount on the basis of the change in variable throttle area S and the change in vehicle speed in accordance with the change in torque voltage from the torque sensor 81a of the variable throttle valve 90 under the action of the constant differential actuator 50. Since all pressure oil from the oil pump 30 is fed into the right chamber 64 of the power cylinder 60 through the variable throttle valve 90 and the electromagnetic switching valve 60, the steering feedling in a left direction with respect to the steering handle 11 may be weighed (or lighted) according to the increase or decrease of the vehicle speed while making power loss of internal combustion engine and oil pump 30 almost zero. Since only the torque sensor 81a is mounted on the steering shaft 12, the steering shaft 12 will have a neat configuration.

While in the above-described operation, the case where the steering handle has been rotated in the left direction, it will be noted that even if the steering handle 11 is rotated in the right direction, the operation and effect substantially similar to those of the aforementioned embodiment may be achieved.

Figure 13:
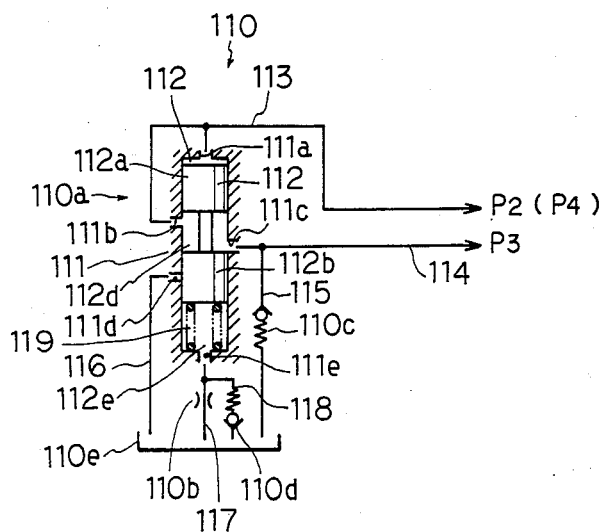
FIG. 13 is an outline view of a pressure oil control mechanism adapted to the first and second embodiments of the present invention.

FIG. 13 shows a pressure oil control mechanism 110 which can be applied, as necessary to the first and second embodiments of the power steering system as described above.

The pressure oil control mechanism 110 comprises a pressure control valve 110a, a fixed throttle 110b, relief valves 110c and 110d, and a reservoir 110e. The pressure control valve 110a has a spool 112 slidably fitted in a housing 111 which is in turn formed with inlet ports 111a, 111b, an outlet port 111c and drain ports 111d and 111e. The inlet ports 111a and 111b are connected to the aforementioned oil passage P2 (or P4) through an oil passage 113. The outlet port 111c is connected to the oil passage P3 through an oil passage 114. The drain port 111e is connected to the reservoir 110e through an oil passage 117 and a fixed throttle 110b which is interposed in the oil passage 117. The drain port 111e is also connected to the reservoir 110e through a branch oil passage 118 and a relief valve 110d which is interposed in the branch oil passage 118.

The spool 112 has a pair of lands 112a and 112b, the land 112a defining an oil chamber 112c in communication with an inlet port 111a, the land 112b defining an oil chamber 112e in communication with a drain port 111e. The lands 112a and 112b also define oil chamber 112d therebetween which is always in communication with an outlet port 111c and is selectively in communication with at least one of the inlet port 111b and drain port 111d. A compression coiled spring 119 is mounted within the oil chamber 112e to always bias the spool 112 toward the oil chamber 112c.

Figure 14:
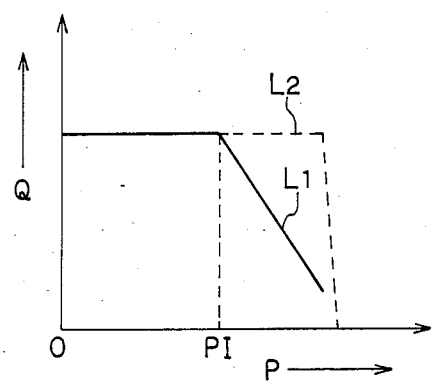
FIG. 14 is a characteristic view showing the relationship between the downstream pressure oil quantity Q and the downstream oil pressure P of the variable throttle valve in the system to which the pressure oil control mechanism is adapted.

When in the pressure control valve 110a, a difference between oil pressure (hereinafter referred to as the downstream oil pressure P) fed into the oil chamber 112c through the oil passage 113 from the downstream portion of a variable throttle (FIG. 1, 40 of FIG. 10, 90) and a springing force of the compression coiled spring 119 is below a predetermined pressure $P_J$, then the spool 12 is positioned at the upper end in FIG. 13 to bring the inlet port 111c into communication with the inlet port 111b, while the spool/and 112b cuts off the drain port 111d. When the difference between the oil pressure in the oil chamber 112c and the springing force of the compression coiled spring 119 is greater than the predetermined pressure $P_J$, the spool 112 is moved down against the compression coiled spring 119 to cut off the oil chamber 112d from the inlet port 111b and to cause oil chamber 112d to communicate with the drain port 111d. In such case, opening areas of the inlet port 111b and drain port 111d relative to the oil chamber 112d vary in proportion to the displacement amount at the corners of the lower end shown in FIG. 13 of the lands 112a and 112b. The aforementioned predetermined pressure $P_J$ corresponds to the maximum value of the downstream oil pressure P of the system of the present invention under normal use (see FIG. 14).

The relief valve 110c is provided to discharge pressure oil into the reservoir 110e while partly passing through the branch oil passage 115 when oil pressure in the oil passage 114 is above a predetermined level, to maintain oil pressure in the oil passage 114 below said predetermined level. The relief valve 110d is provided to feed working oil in the reservoir 110a into the oil chamber 112e through the branch oil passage 118 and drain port 111e in accordance with upward movement of the spool 112 of the pressure control valve 110 whereas at the time of downward movement of the spool 112, inhibiting the discharge of pressure oil into the reservoir 110a through the branch oil passage 115 from the oil chamber 112e. The fixed throttle 110b is provided to discharge pressure oil in the oil chamber 112e into the reservoir 110e through the oil passage 117 at the time of downward movement of the spool 112. In such case, The predetermined throttle area of the fixed throttle 110b is determined so that when oil pressure p in the oil chamber 112c is above the predetermined pressure $P_J$ and the angular velocity $\omega$ of the steering shaft is above a predetermined angular velocity $\omega_0$ (that is, the rate of change of pressure oil with respect to time in the oil chamber 112c is above a value corresponding to the predetermined angular velocity), the discharge of pressure oil in the oil chamber 112e is delayed by a predetermined short period of time (for example, time required for quick operation of the steering wheel 11 when the vehicle travels on the bad road at a low speed, quick operation of the steering wheel 11, etc.).

In the pressure oil control mechanism 110 constructed as described above, the operation thereof will be described in connection with the above-described two embodiments.

When the rotating operation of the steering wheel is relatively slowly carried out when of the vehicle is running on a bad road and the rotative force of the steering wheel is greater than the value under normal operating conditions, the downstream oil pressure P passing through the oil passage 113 and generated within the oil chamber 112c of the pressure control valve 110a gently increases exceeding the predetermined pressure $P_J$, in response to which the spool 112 is moved down slowly against the compression coiled spring 119 to discharge pressure oil in the oil chamber 112e into the reservoir 110e through the drain port 111e and fixed throttle 110b. At the same time an area of communication between the inlet port 111b is reduced to oil chamber 112d and increase an area of communication between the drain port 111d and oil chamber 112d.

Next, upon the slow decrease in communication area of the inlet port 111b and the slow increase in communication area of the drain port 111d, pressure oil in the low pressure chamber 53 of the aforementioned constant differential actuator 50 is slowly discharged into the reservoir 110e through the oil passage 114, outlet port 111c of the pressure control valve 110a and the drain port 111d thereof and the oil passage 116, and when this occurs, the diaphragm 52 of the constant differential actuator 50 slowly reduces the eccentric amount e of the eccentric cam 31 of the oil pump 30. Since the rotational speed of the internal combustion engine rarely changes under these transient conditions, the discharge quantity of pressure oil from the oil pump 30 slowly reduces in accordance with the decrease in eccentric amount e as described, and the downstream pressure oil quantity Q from the variable throttles (40, 90) also slowly reduces in accordance with the increase in the downstream oil pressure P (see FIG. 14, symbol $L_1$). Accordingly, the downstream pressure oil quantity Q from the variable throttle is fed to one selected cylinder chamber of the power cylinder 60, in the quantity enough to properly aid the slow rotating operation of the steering wheel 1 in the left direction under the travelling condition of the vehicle on the bad road. Therefore, it is possible to secure the adequate slow steering feeling under the travelling condition of the vehicle on the bad road while effectively relieving the power loss of the prime mover and oil pump 30.

When the rotating operation of the aforementioned steering wheel is rapidly effected when the vehicle is operating on a bad road and the rotative force thereof is greater than the value under normal operating conditions, the downstream oil pressure P generated in the oil chamber 112c of the pressure control valve 110d rapidly increases beyond the predetermined pressure $P_I$, in response to which the spool 112 is abruptly moved down in the procedure similar to that as described above. However, since pressure oil in the oil chamber 112e of the pressure control valve 110a is checked for its discharge into the reservoir 110e on the basis of the predetermined throttle area, the spool 112 remains positioned at the end of the upward movement without the spool 112 being moved down, and the constant differential actuator 50 maintains the downstream pressure oil quantity Q from the variable throttle constant for the aforesaid predetermined period of time as shown at symbol $L_2$ in FIG. 14.

Accordingly, the downstream pressure oil quantity Q from the variable throttle is fed into one cylinder chamber of the power cylinder 60 in the quantity enough to adequately aid the rapid rotating operation of the steering wheel 11 in the left direction under the running condition of the vehicle on the bad road. Thereafter, when the rapid rotating operation of the steering wheel 11 is terminated by the lapse of the aforesaid predetermined short period of time, pressure oil in the oil chamber 112e of the pressure control valve 110a is discharged into the reservoir 110e through the fixed throttle 110b and the spool 112 is moved down so that pressure oil in the low pressure chamber 53 of the constant differential actuator 50 is rapidly discharged through the outlet port 111c and inlet port 111d of the pressure control valve 110a and the oil passage 116. The constant differential actuator 50 reduces the eccentric amount e of the eccentric cam 31 of the oil pump, by the upward movement of the diaphragm 52, to reduce the downstream pressure oil quantity Q from the variable throttle. This means that an adequate rapid steering feeling under the running of the vehicle on the bad road may be secured while effectively relieving the power loss of the prime mover and oil pump 30.

What is claimed is:

1. A power steering system for vehicles comprising:
   means for receiving a force indicative of a desired degree of turning;
   a variable discharge pump having a discharge quantity per operating stroke which may be varied;
   variable throttle means, connected to said pump, for varying resistance to flow in accordance with said force received by said receiving means;
   means for assisting turning in response to said flow from said variable throttle means;
   means for controlling a discharge quantity of said pump to maintain constant a pressure differential across said variable throttle means;
   pressure control means for decreasing pressure sensed by said controlling means downstream of said variable throttle means when said pressure downstream of said variable throttle means exceeds a predetermined level to cause said controlling means to decrease a discharge quantity of said pump; and
   means for delaying said pressure decreasing by said pressure control means for a predetermined short period of time when the rate of change of pressure downstream of said variable throttle means exceeds a predetermined value.

2. The system according to claim 1 further comprising a compensation means for causing said variable throttle means to permit a predetermined small flow when said force received by said receiving means is a minimum value.

3. The system according to claim 2, wherein said compensating means comprises a compensating mechanism formed in said variable throttle means to cause a cross sectional area of said variable throttle means to maintain in a predetermined minimum value or more.

4. The system according to claim 1, wherein:
   said receiving means includes a steering shaft and a torsion bar provided coaxially with said steering shaft to produce a torsional angle in accordance with the steering torque; and
   said variable throttle means includes first and second members secured to the opposite ends of said torsion bar to form an opening, whose opening area varies in accordance with said torsional angle.

5. The system according to claim 1, wherein said receiving means includes:
   a steering shaft;
   a detection means for detecting a steering torque in accordance with rotation of said steering shaft and generating a torque signal indicative of the steering torque;
   a signal generating means for obtaining an optimum value from said torque signal based on a predetermined relation between said steering torque and the optimum value of a cross sectional area of said variable throttle means and generating an output signal representative of said optimum value; and
   an electric-mechanical conversion means for adjusting a cross sectional area of said variable throttle means in response to said output signal.

6. The system according to claim 1 further comprising a rotating motor for driving said pump and speed control means for reducing the rotational speed of said motor in accordance with an increase in travelling speed of said vehicle.

7. The system according to claim 1, wherein said receiving means including a steering shaft and detection means for detecting a steering torque in accordance with rotation of said steering shaft to generate a torque signal indicative of the steering torque; and said variable throttle means includes speed detection means for detecting a travelling speed of said vehicle to generate a speed signal indicative of the travelling speed, signal generating means for obtaining an optimum value in accordance with said torque signal and said travelling speed from a predetermined relation between said steering torque and the optimum value of a cross sectional area of said variable throttle means, said signal generating means generating an output signal representative of said maximum value, and an electric-mechanical conversion means for adjusting said cross sectional area of said variable throttle means in response to said output signal.

8. The system according to claim 1 wherein said pressure control means comprises:
   a valve body connected to a downstream side of said variable throttle means, said controlling means and a low pressure; and
   a valve element movable in said valve body to cause said downstream side of said variable threshold means to communicate with said controlling means when said pressure downstream of said variable throttle does not exceed a predetermined level and for causing said controlling means to communicate with said low pressure when said pressure downstream of said variable throttle means exceeds said predetermined level.

9. The system according to claim 8 wherein said valve element includes first and second interconnected spools defining a chamber therebetween, and said pressure control means includes a spring biasing said first and second spools in a first direction to cause said second spool to block said low pressure and to cause said downstream side of said variable throttle means and said controlling means to communicate through said chamber when said pressure downstream of said variable throttle valve does not exceed said predetermined level, pressure on said downstream side of said variable throttle means forcing said valve element against said spring so that said first spool blocks connection to said downstream side of said variable throttle means and said controlling means and said low pressure communicate through said chamber when said pressure on said downstream side exceeds said predetermined level.

10. The system according to claim 9 wherein said valve body and said valve element define another chamber between said valve body and said second spool on a side of said second spool opposite said chamber, and said delaying means includes a passage connecting said another chamber to low pressure and a throttle disposed in said passage.

11. The system according to claim 10 wherein said delaying means further comprises a check valve connected between said another chamber and said low pressure to easily allow flow into said another chamber around said throttle.

12. The system according to claim 8 wherein said delaying means includes means for resisting movement of said valve element for said predetermined short period of time when the rate of change of pressure downstream of said variable throttle means exceeds said predetermined value.

* * * * *